(12) United States Patent
Marcus et al.

(10) Patent No.: US 8,134,591 B2
(45) Date of Patent: Mar. 13, 2012

(54) DISPLAY USING BIDIRECTIONALLY SCANNED LINEAR MODULATOR

(75) Inventors: Michael A. Marcus, Honeoye Falls, NY (US); John A. Agostinelli, Rochester, NY (US); Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 888 days.

(21) Appl. No.: 12/116,467

(22) Filed: May 7, 2008

(65) Prior Publication Data
US 2009/0278918 A1 Nov. 12, 2009

(51) Int. Cl.
*H04N 13/04* (2006.01)
(52) U.S. Cl. .................................... 348/54; 348/51
(58) Field of Classification Search .............. 348/51, 348/53, 54, 57, 58
See application file for complete search history.

(56) References Cited

U.S. PATENT DOCUMENTS

| | | | |
|---|---|---|---|
| 5,982,553 A | 11/1999 | Bloom et al. | |
| 6,215,579 B1 | 4/2001 | Bloom et al. | |
| 6,307,663 B1 | 10/2001 | Kowarz | |
| 6,411,425 B1 | 6/2002 | Kowarz et al. | |
| 6,476,848 B2 | 11/2002 | Kowarz et al. | |
| 6,535,241 B1 | 3/2003 | McDowall et al. | |
| 6,663,788 B2 | 12/2003 | Kowarz et al. | |
| 6,802,613 B2 | 10/2004 | Agostinelli et al. | |
| 7,001,021 B2 | 2/2006 | Jorke | |
| 7,053,930 B2 | 5/2006 | Webb et al. | |
| 7,180,554 B2 | 2/2007 | Divelbiss et al. | |
| 7,204,592 B2 | 4/2007 | O'Donnell et al. | |
| 7,274,500 B2 | 9/2007 | Kowarz | |
| 7,623,111 B2* | 11/2009 | Ioki et al. | 345/102 |
| 7,826,136 B2* | 11/2010 | Koo et al. | 359/463 |
| 7,911,547 B2* | 3/2011 | Brott et al. | 349/15 |
| 8,054,329 B2* | 11/2011 | Shestak et al. | 348/57 |
| 8,059,217 B2* | 11/2011 | Brott et al. | 349/15 |
| 2003/0112507 A1 | 6/2003 | Divelbiss | |
| 2007/0047061 A1 | 3/2007 | Kowarz | |
| 2007/0159602 A1 | 7/2007 | Fergason | |
| 2007/0200792 A1* | 8/2007 | Kim et al. | 345/7 |
| 2008/0036853 A1* | 2/2008 | Shestak et al. | 348/51 |
| 2008/0084519 A1* | 4/2008 | Brigham et al. | 349/65 |
| 2009/0231697 A1* | 9/2009 | Marcus et al. | 359/465 |
| 2011/0134347 A1* | 6/2011 | Brott et al. | 349/15 |

FOREIGN PATENT DOCUMENTS

| | | | |
|---|---|---|---|
| EP | 0 712 109 A | 5/1996 | |
| EP | 1 359 456 A | 11/2003 | |

* cited by examiner

*Primary Examiner* — Moustafa M Meky
(74) *Attorney, Agent, or Firm* — J. Lanny Tucker; Nelson Adrian Blish

(57) ABSTRACT

A method for forming a stereoscopic image forms separate left-eye and right-eye images in a repeated cycle that forms the left-eye image by providing data for lines of the left-eye image, ordered in sequence from a first to a second edge of an image frame, then forms successive lines of modulated light according to the ordered sequence by progressively scanning lines of modulated light across a display surface by rotating a scanning element forward from a first to a second position. The right-eye image is formed by providing data for lines of the right-eye image, ordered in sequence from the second to the first edge of the image frame and forming successive lines of modulated light, progressively scanning the lines of modulated light across the display surface by rotating the scanning element in reverse from the second to the first position. The left-eye image is distinguished from the right-eye image.

20 Claims, 17 Drawing Sheets

DISPLAY USING BIDIRECTIONALLY SCANNED LINEAR MODULATOR

CROSS REFERENCE TO RELATED APPLICATIONS

Reference is made to commonly-assigned copending U.S. patent application Ser. No. 11/950,488, filed Dec. 5, 2007, entitled DISPLAY APPARATUS USING BILINEAR ELECTROMECHANICAL MODULATOR, by Agostinelli et al.; and U.S. patent application Ser. No. 12/047,605, filed Mar. 13, 2008, entitled STEREOSCOPIC DISPLAY USING MULTILINEAR ELECTROMECHANICAL MODULATOR, by Marcus et al., the disclosures of which are incorporated herein.

FIELD OF THE INVENTION

This invention generally relates to display apparatus using linear light modulators and more particularly relates to a display apparatus and method for forming stereoscopic images by scanning modulated light, one line at a time per color, across a display surface.

BACKGROUND OF THE INVENTION

Linear light modulators form images by a rapid, repeated sequence in which each single line of the image is separately formed and is directed to a screen or other display surface by reflection, or other type of redirection, from a scanning element. Types of linear light modulators that operate in this manner include devices such as grating light valve (GLV) designs, offered by Silicon Light Machines and described in U.S. Pat. No. 6,215,579 (Bloom et al.), and elsewhere. Display systems based on GLV devices are disclosed, for example, in U.S. Pat. No. 5,982,553 (Bloom et al.).

An improved type of linear light modulator is the grating electro-mechanical system (GEMS) device, as disclosed in commonly-assigned U.S. Pat. No. 6,307,663 (Kowarz), and elsewhere. Display systems based on a linear array of conformal GEMS devices are described in commonly-assigned U.S. Pat. No. 6,411,425, and U.S. Pat. No. 6,476,848 (both to Kowarz et al.). Further detailed description of GEMS device architecture and operation is given in a number of commonly-assigned U.S. patents and published applications, including U.S. Pat. No. 6,663,788 (Kowarz et al.), and U.S. Pat. No. 6,802,613 (Agostinelli et al.). In GEMS devices, light is modulated by diffraction. On a GEMS chip, the linear array of conformal electromechanical ribbon elements, formed on a single substrate, provides one or more diffracted orders of light to form each line of pixels for line-scanned projection display.

GLV and GEMS color display system architectures generally employ three separate color paths, red, green, and blue (RGB), each color path provided with a linear array of electromechanical grating devices. Each linear array of electromechanical grating devices, when actuated, modulates its component red, green, or blue laser light to form a single line of the image at a time. The resulting modulated lines of light for each color are then combined onto the same output axis to provide a full-color image that is then scanned to the display screen.

In general, linear light modulator arrays are advantaged over their area array spatial light modulator (SLM) counterparts by virtue of higher resolution, reduced cost, and simplified illumination optics. GLV and GEMS devices are actuable to operate at fast switching speeds and are able to modulate laser light. GLV and GEMS devices have advantages for high resolution, high native bit depth, variable aspect ratio, and freedom from motion artifacts, when compared with other types of spatial light modulators. However, there are some inherent limitations for display solutions that use these devices. The galvanometrically actuated scanning mirror that is conventionally used to scan modulated light across the display surface scans by rotating over a short angular range to form a single 2-D (two-dimensional) frame of the image, then must be reset, rotating back into position for the next scan. During this reset time, no image content can be projected using the standard scanning scheme. Over about 15-25% of the time, the mirror is rotating back into position for the next scan. This reduces the available light output and limits the light efficiencies that can be obtained. Due to mirror reset time and acceleration and deceleration times of the scanning mirror, the effective duty cycle for providing modulated light with such systems, the so-called "pixel on" time, is no more than about 72-82%.

One response to the need for improved efficiency has been to change mirror cycle timing and to project image content during rotation of the scanning mirror in each direction. This strategy is described in U.S. Pat. No. 7,053,930 (Webb et al.). This approach projects modulated light over an additional amount of time, gaining between 5 and 10% improvement in efficiency over the earlier timing cycle, but requires multiple refreshes of the same image frame during projection. Bidirectional scanning for 2-D imaging also sacrifices image resolution somewhat in practice, particularly for displays having high resolution.

Stereoscopic projection is one area of particular interest for cinema projection overall. Conventional configurations for stereo projection include configurations that use two projectors, one for the left eye and the other for the right eye. This basic model has been applied with earlier film-based systems, as well as with digital projection equipment, from vendors such as Barco Corporation. Although such two-projector designs have successfully shown the feasibility and enhanced imaging capabilities afforded by stereoscopic imaging systems, these systems are expensive, require precision alignment to each other, and impose some additional requirements on theater design and layout. Because stereoscopic display methods usually provide alternate left- and right-eye images, separated in time, they typically require more than twice the nominal light output of 2-D displays to achieve the same brightness. Stereoscopic solutions have been implemented using a single projector, but generally at the cost of reduced light output. Conventional solutions such as doubling the number of light sources or doubling the number of light modulators are feasible, but are also expensive and impractical.

The conventional modulation scheme that has been used for 2-D imaging does not easily adapt to the requirements of stereoscopic or 3-D (three-dimensional) imaging. Simply doubling frame refresh rates from 60 Hz to 120 Hz and alternating left- and right-eye image sub-frames does not appear to be a desirable solution. Higher frame rates place demands on scanning devices, such as a galvanometric scanner, that can be difficult to meet. The higher frame rate necessary for stereoscopic imaging using conventional techniques increases the bandwidth requirement for projector electronics and reduces the minimum pixel drive pulse width for pulse-width modulated light valve arrays.

In the face of these difficulties, linear light modulators seem unlikely contenders for the stereoscopic imaging market. The excessive cost of providing multiple projector devices, registered to each other for independently providing left- and right-eye images, and the complex data paths, alignment, and timing that would be required to coordinate and project left- and right-eye modulated light make dual-projector solutions unattractive and well out of the price range of lower-cost equipment. Other conventional approaches to stereoscopic display using a single projector have required considerable complexity and, due at least in part to disappointing brightness in the displayed output, may not yield pleasing results in the final image that is displayed.

Thus, there is need for stereoscopic display methods that can take advantage of the particular strengths of GEMS, GLV, and other linear light modulators for forming stereoscopic images.

SUMMARY OF THE INVENTION

It is an object of the present invention to address the need for improved stereoscopic projection apparatus. With this object in mind, the present invention provides a method for forming a stereoscopic image comprising:
a) forming separate left-eye and right-eye images in a repeated cycle that comprises:
  (i) forming the left-eye image by providing data for lines of the left-eye image, ordered in sequence from a first edge of an image frame to a second edge of the image frame;
  forming successive lines of modulated light according to the ordered sequence of provided data for lines of the left-eye image and progressively scanning the lines of modulated light across a display surface from a first position to a second position;
  (ii) forming the right-eye image by providing data for lines of the right-eye image, ordered in sequence from the second edge of the image frame to the first edge of the image frame;
  forming successive lines of modulated light according to the ordered sequence of provided data for lines of the right-eye image and progressively scanning the lines of modulated light across the display surface from the second position to the first position; and
b) distinguishing the left-eye image from the right-eye image for at least one viewer.

From another aspect, the present invention provides a method for displaying an image on a display surface in either of two modes by switching between:
  (i) forming a two dimensional image by a repeated sequence of progressively scanning lines of modulated light towards a display surface while rotating a scanning element forward from a first position to a second position; and
  (ii) forming a stereoscopic image that comprises a left-eye image and a right-eye image, by the repeated steps of:
    forming the left-eye image by progressively scanning lines of modulated light towards a display surface while rotating a scanning element forward from a first position to a second position; and
    forming the right-eye image by progressively scanning lines of modulated light towards the display surface while rotating the scanning element backward from the second position to the first position.

It is a feature of the present invention that it allows mode selection between either 2-D projection or 3-D stereoscopic projection for a single projection device, using the same scanned linear array apparatus and electronic processing circuitry.

It is an advantage of the present invention that it can improve the effective duty cycle over conventional methods for stereoscopic display, yielding added brightness.

It is an advantage of the present invention that it provides stereoscopic projection using three or more solid-state light sources with reduced complexity and reduced optical alignment requirements over conventional designs.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
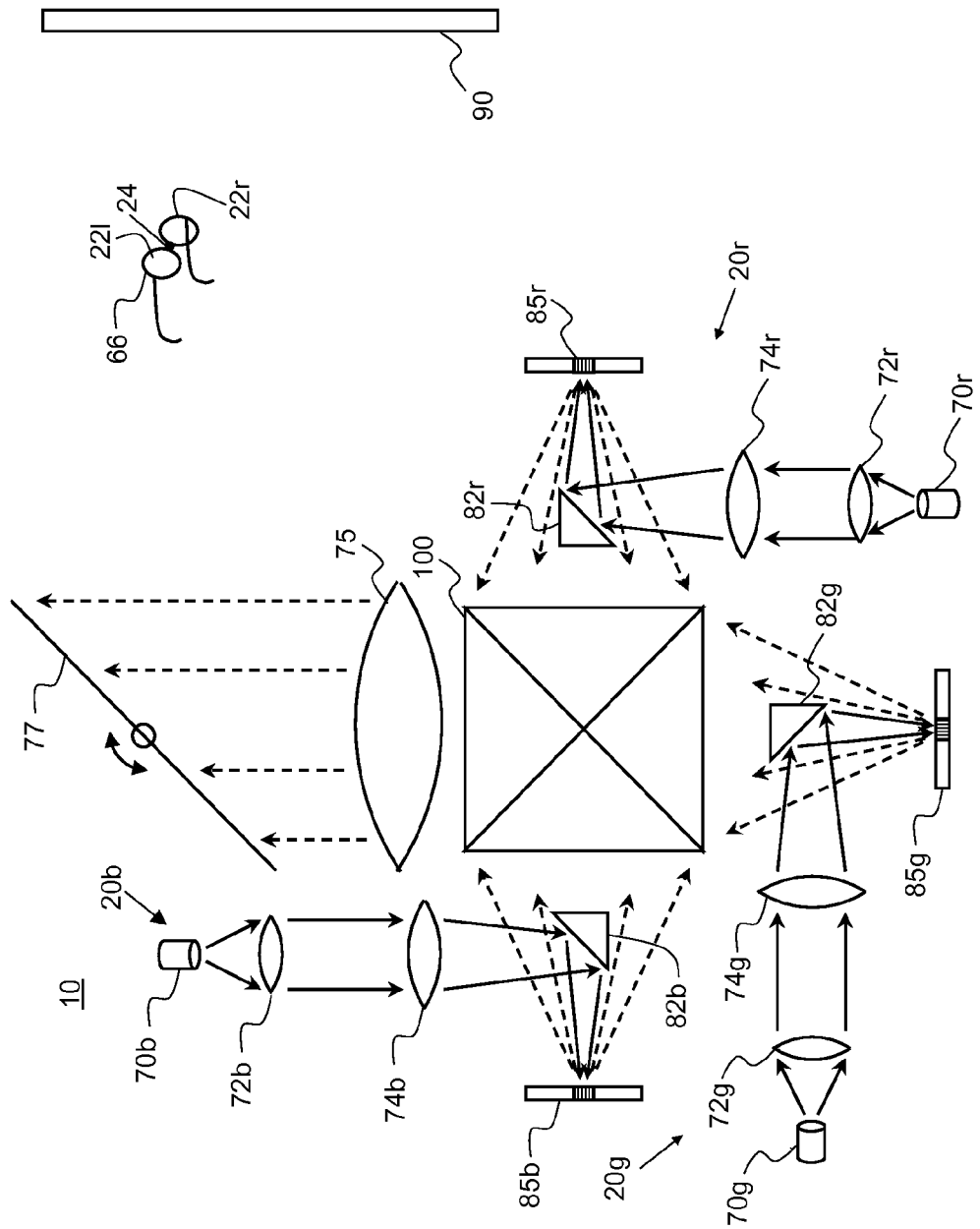
FIG. 1 is a schematic block diagram showing a stereoscopic display apparatus in one embodiment of the present invention.

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

In the following disclosure, the phrase "left-eye image" denotes the image formed by a display apparatus and intended for viewing by the left eye of the viewer. Likewise, the phrase "right-eye image" refers to the separate image that is intended for viewing from the right eye of the viewer. The terms "stereoscopic" and "3-D" are considered to be equivalent.

In the context of the present invention, the term "spectral range" refers to a single wavelength or to a relatively narrow range of wavelengths of no more than about 40 nm. Spectral stereo vision separation embodiments project left- and right-eye images at different wavelengths for each primary color (red, green, or blue, conventionally referred to as R, G, or B) and use filter elements to separate the left- and right-eye image content for each color.

For distinguishing images as separate, some other embodiments of the present invention use orthogonally polarized light as the distinguishing feature between left- and right-eye images. Polarization can be linear, elliptical, or circular, with the modulated light for the left eye orthogonally polarized with respect to the modulated light for the right eye.

Embodiments of the present invention use linear light modulators such as multilinear grating electromechanical systems (GEMS) devices, GLV devices, and other types of linear modulators. The GEMS or other type of linear light modulator provide stereoscopic display apparatus that allow advantages such as improved use of laser light sources and increased brightness, from a single projector and using less complex optical designs than had been previously proposed.

In the context of the present invention, the term "chip" is used as it is familiarly used by those skilled in the micro-electromechanical device arts. The term chip refers to the one-piece electromechanical circuit package that includes one or more linear light modulator arrays formed on a single substrate, such as the conformal grating devices described in detail in commonly-assigned U.S. Pat. No. 6,411,425 (Kowarz et al.), mentioned earlier. The GEMS chip not only includes the elongated ribbon elements that form the light-modulating grating for light reflection and diffraction, but may also include the underlying circuitry that applies the electrostatic force that is used to actuate these ribbon elements. In manufacture, the tiny electronic and mechanical components that form the chip, such as the GEMS chip shown in the Kowarz et al. '425 patent, are fabricated onto a single substrate. The chip package also includes signal leads for interconnection and mounting onto a circuit board or other suitable surface.

Approaches for Stereoscopic Projection

With any type of stereoscopic projection system, some type of separation mechanism is needed in order to allow distinction or separation between the left- and right-eye images that are combined on a common display screen, but are intended for the appropriate left and right eyes of the viewers. Left- and right-eye images can be separated in time, can be of different polarizations relatively orthogonal to each other, or can be of different wavelengths.

Time-sequencing systems use a "page-flipping" technique for separating left- from right-eye images. Page-flipping alternately displays left- and right-eye images to provide stereo images to one or more viewers wearing shutter glasses that are synchronized to the display refresh rates. One example of this type of display system adapted for presenting stereoscopic images to multiple viewers is given in U.S. Pat. No. 6,535,241 (McDowall et al.). The limited amount of time available for each viewer to see each frame of the image constrains the utility of this approach.

Stereoscopic systems using polarization differences provide distinct left- and right-eye images using light at respectively orthogonal polarizations. Viewers are provided with polarized glasses for distinguishing these left- and right-eye images. One example of this type of display system using linearly polarized light is given in U.S. Pat. No. 7,204,592 (O'Donnell et al.). A stereoscopic display apparatus using left- and right-circular polarization is described in U.S. Pat. No. 7,180,554 (Divelbiss et al.).

Stereoscopic systems can distinguish separate left- and right-eye images by wavelength and provide viewers with filter glasses that are suitably designed to distinguish the appropriate image for each eye. One example of this type of spectral separation display system is given in U.S. Pat. No. 7,001,021 (Jorke).

The methods and apparatus of embodiments of the present invention provide ways to display stereoscopic images using time-sequencing, polarization- or spectral-based separation methods for differentiating left- and right-eye images. Subsequent description shows embodiments that use each of these methods.

Referring to FIG. 1, there is shown a stereoscopic display system 10 using a GEMS device as linear light modulator in each of three color channels, a red color channel 20r, a green color channel 20g, and a blue color channel 20b. For red color modulation, a red light source 70r, typically a laser or laser array, provides illumination that is conditioned through a spherical lens 72r and a cylindrical lens 74r and directed towards a turning mirror 82r. Light reflected from turning mirror 82r is modulated by diffraction at a linear light modulator 85r, shown and described herein as an electromechanical grating light modulator. Modulated diffracted light from linear light modulator 85r is diffracted past turning mirror 82r and to a color combiner 100, such as an X-cube or other dichroic combiner. The modulated line of light from color combiner 100 is then directed by a lens 75, through an optional cross-order filter (not shown), to a scanning element 77 for projection onto a display surface 90. Scanning element 77 can be a scanning mirror or other suitable light-redirecting scanning element, such as a rotating prism or polygon or an apparatus having one or more coupled reflective surfaces, which apparatus, in turn, directs the incident modulated lines of light for left- and right-eye images toward display surface 90. Green color modulation uses a similar set of components for providing light to color combiner 100, with a green light source 70g, typically a laser or laser array, providing illumination through a spherical lens 72g and a lens cylindrical 74g and directed towards a turning mirror 82g. Light reflected from turning mirror 82g is modulated by diffraction at an electromechanical grating light modulator that serves as a linear light modulator 85g. Modulated diffracted light from linear light modulator 85g is diffracted past turning mirror 82g and to color combiner 100. Similarly, blue light source 70b, typically a laser or laser array, provides illumination through a spherical lens 72b and a cylindrical lens 74b and directs light towards a turning mirror 82b. Light reflected from turning mirror 82b is modulated by diffraction at an electromechanical grating light modulator that serves as a linear light modulator 85b, is diffracted past turning mirror 82b, and is sent as a line of light to color combiner 100.

A decoding device is used for distinguishing the left-eye image from the right-eye image for the viewer. The embodiment of FIG. 1 shows glasses 66 as a decoding device. Glasses 66 of this type, worn by each viewer, are suitably equipped with left and right distinction elements 22l and 22r, such as shutters, filters, or polarizers for distinguishing left- and right-eye images. It should be noted that glasses 66 are one of a number of possible types of decoding devices that could be used for left- and right-eye image separation. For the embodiment of FIG. 1, glasses 66 are equipped with shutters that alternate between display of the left-eye image and right-eye image and are equipped with a synchronization element 24 for actuating the shutters at the appropriate times. Synchronization element 24 can be, for example, circuitry controlled by a wireless synchronization signal provided from projector logic circuitry, as described in more detail subsequently.

Figure 2:
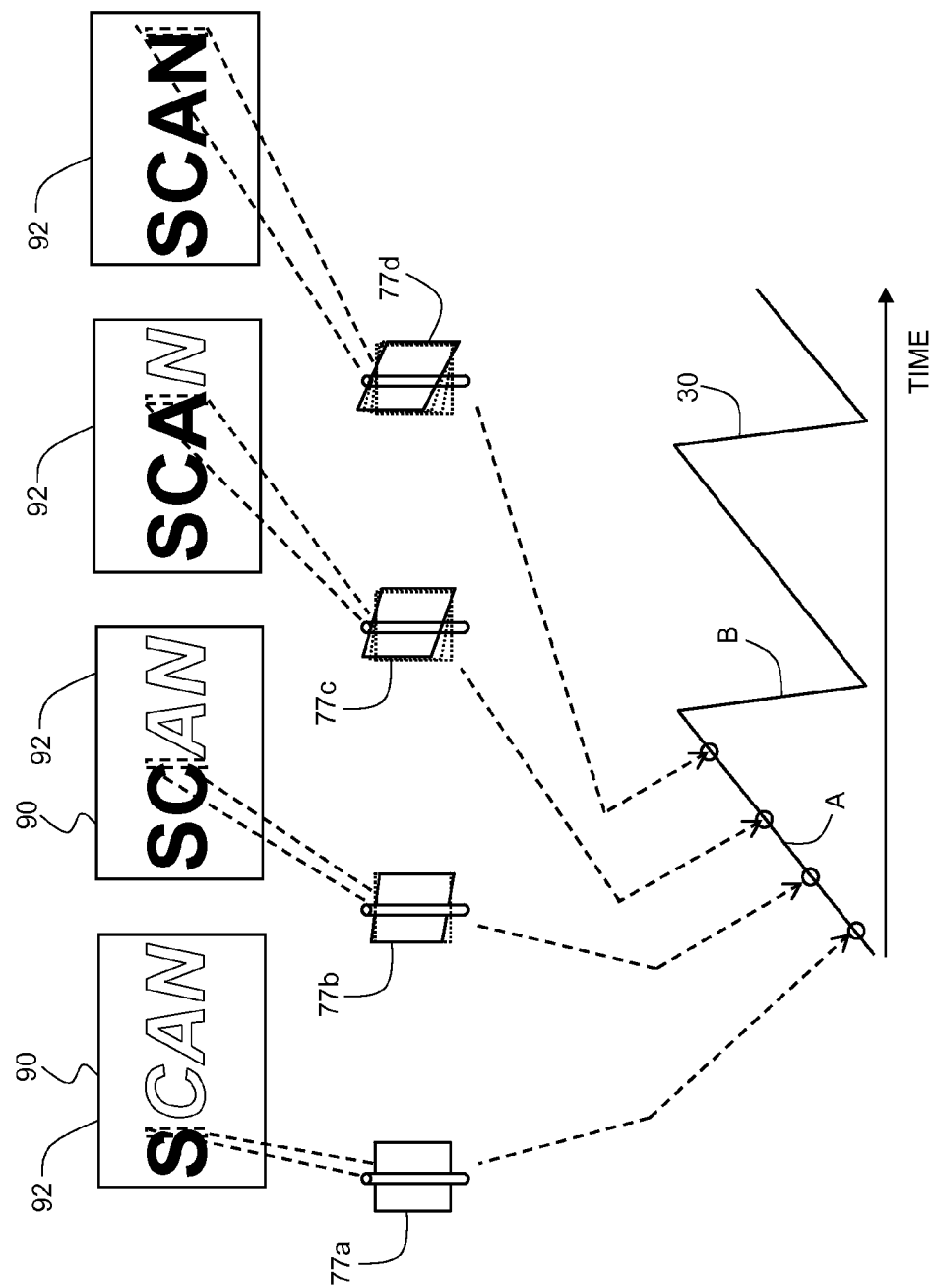
FIG. 2 is a block diagram showing a scan sequence for conventional scanning by a scanning mirror.

For a better understanding of how the embodiment of FIG. 1 provides stereoscopic display using only a single GEMS modulator or other type of linear light modulator 85 in each color channel, it is instructive to consider how scan timing is carried out and the response behavior of scanning element 77. FIG. 2 shows conventional scan timing, representing what happens on the rising or writing portion A and falling or retrace portion B of a drive signal 30, the timing control signal that is provided to scanning element 77. Two adjacent signal curve portions A and B correspond to a single cycle of scanning element 77 movement. Writing data on the screen using the linear light modulators 85r, 85g, and 85b occurs in this example when scanning element 77 redirects lines of modulated light to successive positions, from left to right, generating an image frame 92 on display surface 90, during portion A of drive signal 30. During the retrace portion B in FIG. 2 the scanner is moving from the right to left at a faster rate than it moved during the writing portion of the scan and no data is written to the screen during the retrace portion B. The upper portion of FIG. 2 shows "snapshots" of scanning progress at successive positions of the scanning element, shown as 77a, 77b, 77c, and 77d, respectively.

Figure 3:
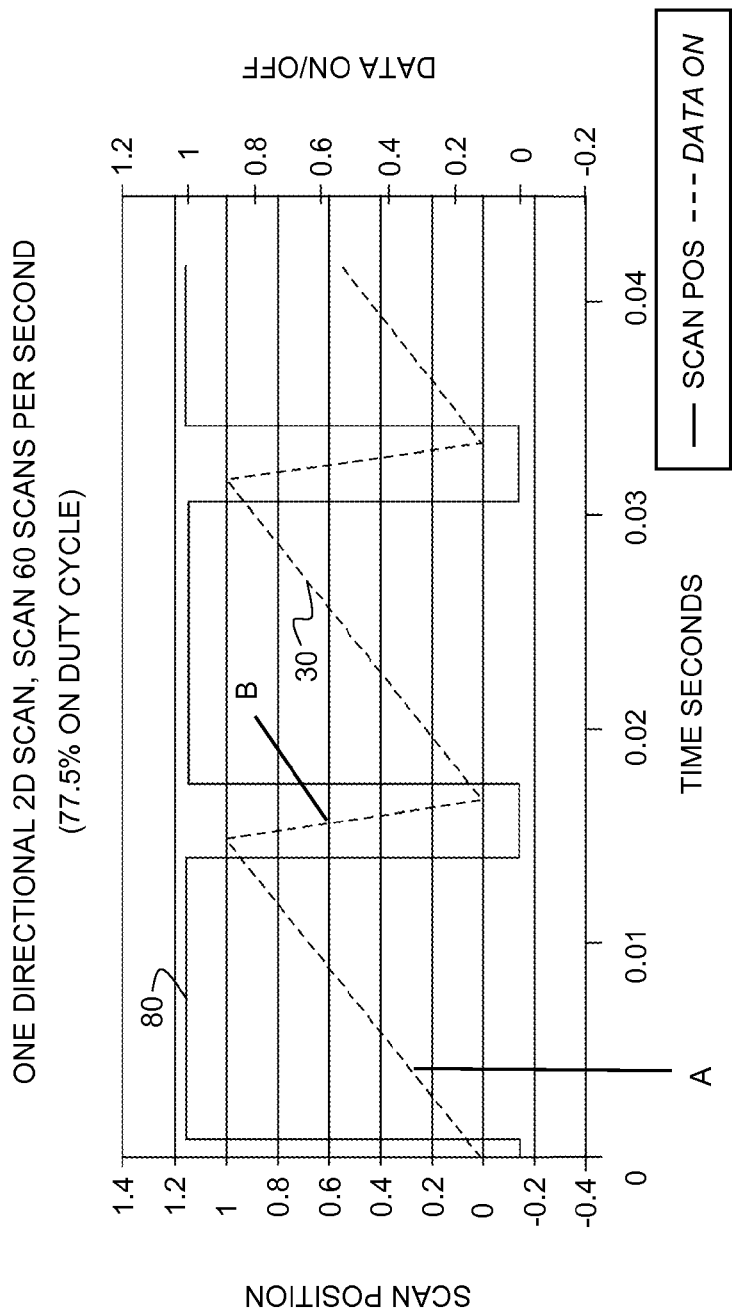
FIG. 3 is a timing diagram for conventional scanning by a scanning element.

The graph of FIG. 3 shows the timing diagram with writing portion A and retrace portion B of the scanning cycle in more detail. A data writing curve 80 shows the "data on" or "pixel on" portion of timing (shown as a value of 1), when writing data is provided for modulation and scanning. The "data off" or "pixel off" portion of this timing (shown as a value of 0) occurs during retrace activity and momentarily just before and just following retrace, as scanning element 77 (FIG. 1) decelerates or accelerates.

For stereoscopic viewing using the conventional scan timing, left- and right-eye images are interleaved. The image for the left-eye is scanned during writing portion A of every other cycle (for example, during cycles 1, 3, 5, 7, . . . ); the image for the right eye is scanned during every alternate cycle (for example, cycles 2, 4, 6, 8, . . . ). Glasses 66 can be shutter glasses or use some other type of left-eye/right-eye image distinction scheme. Using this arrangement, in order to refresh the image frequently enough to reduce flicker, one option is to speed up the process described with reference to FIGS. 2 and 3. This means nominally doubling the frequency of the timing pulses in drive signal 30, doubling the rotational speed of scanning element 77, and moving data faster through processing and imaging operations. However, with this approach, a higher duty-cycle must be maintained, requiring higher performance from the galvanometer or other reciprocating scanning element in terms of its ability to accelerate the mirror mass. The required higher performance increases scanning component size, drive current, waste heat, and cost, and places competing constraints on the mirror. Higher accelerations mean increased stiffness requirements, thus increased mass. Alternately, the problem could be addressed with higher complexity of the mirror design or by use of specialized mirror materials or with different scanning mechanisms; however, these approaches lead to increased cost. Overall, it is important to maintain a high enough writing duty-cycle to maximize projected image brightness.

The method of the present invention addresses the task of stereoscopic display by modifying the drive signal timing and then scanning lines of the image during both the writing portion and the retrace portion of the curve. Referring to the timing example of FIG. 4, the scan sequence for both eyes is summarized schematically. The scanning cycle, shown at S in the figure, has both forward (A) and retrace (B) portions. The left-eye image is formed as scanning element 77 progressively scans in one direction, shown as left to right in FIG. 4, during the A portion of a galvanometer drive signal 32. This movement scans from a first edge of the image E1 to a second edge E2.

Figure 4:
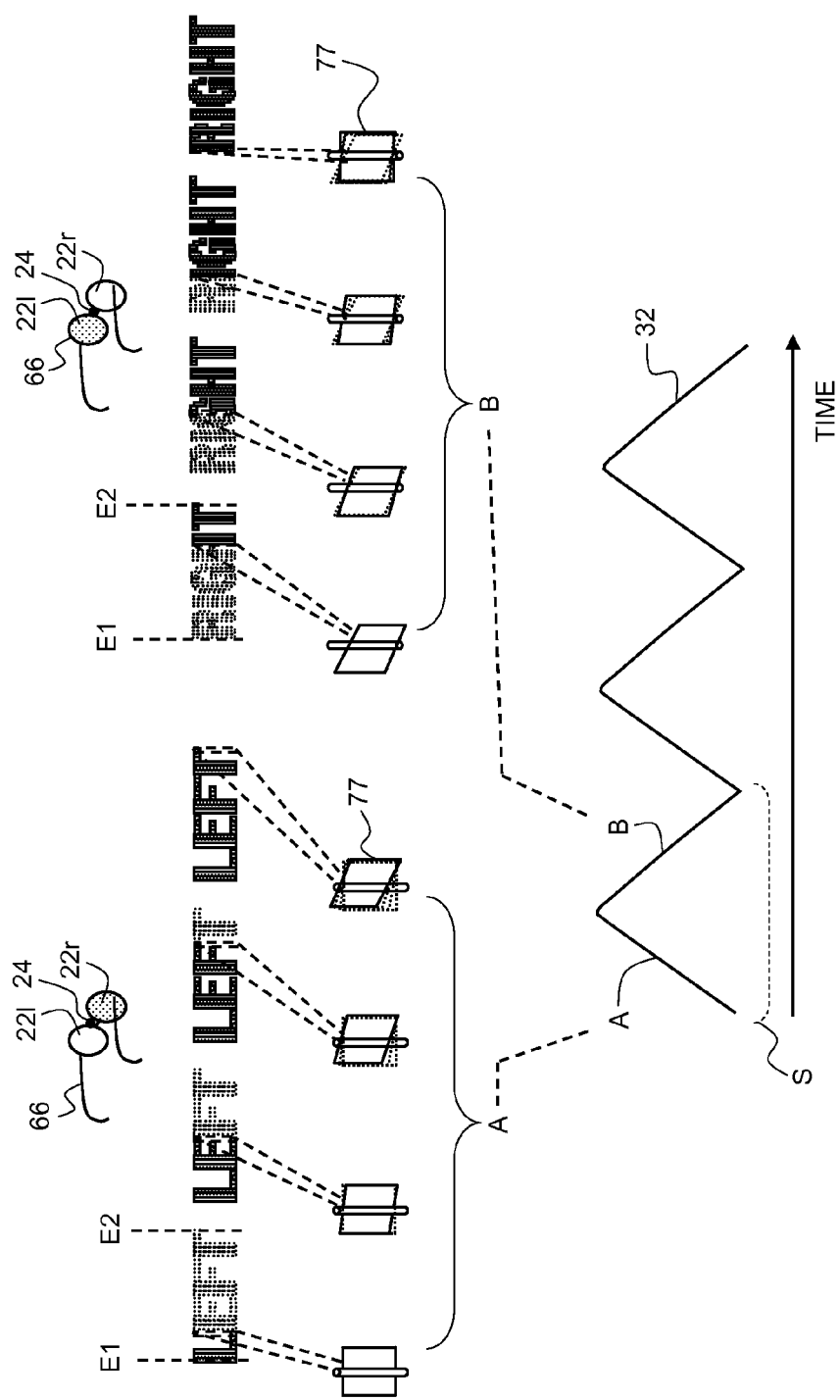
FIG. 4 is a block diagram showing a bidirectional scan sequence for alternating left- and right-eye image display as used in various embodiments.

The retrace or B portion shown in FIG. 4 is extended from that described with reference to FIGS. 2 and 3, so that the waveform is triangular (that is, symmetric), as shown. The right-eye image is then formed by progressively scanning in the opposite (retrace) direction during this B portion. This movement scans from second edge E2 of the image back toward first edge E1. Shutter glasses 66 are used in one embodiment, synchronized with the scan timing for cyclically distinguishing the left-eye image from the right-eye image, directing the intended image to the appropriate eye of the viewer and blocking the alternate image. Where timing drive signal 32 is at 60 Hz, shutter glass switching between eyes occurs at 120 Hz. Cycling between transmission for each successive left or right-eye image is also at 60 Hz.

Figure 5A:
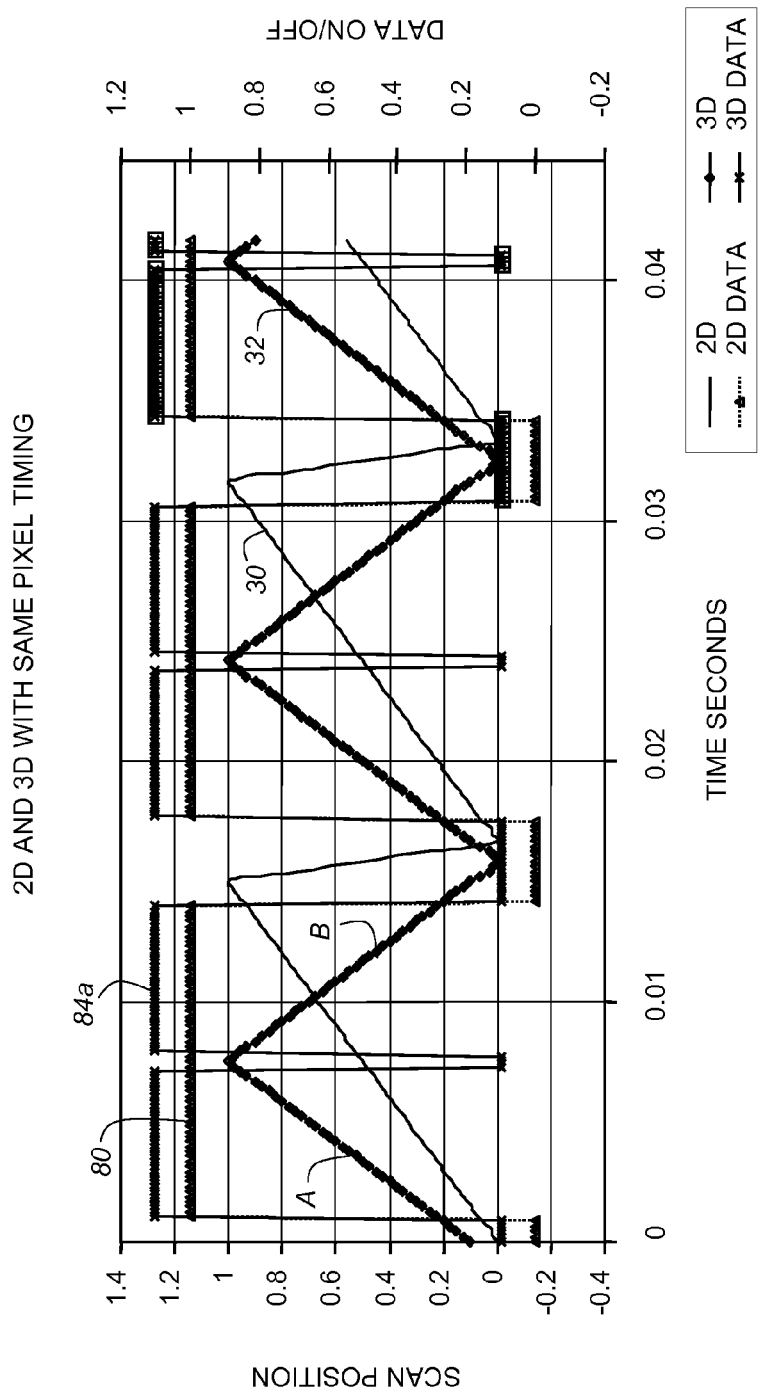
FIG. 5A is a timing diagram comparing the 2-D scan sequence with a bidirectional scan sequence for alternating left- and right-eye image display scanning by a scanning element.
Figure 5B:
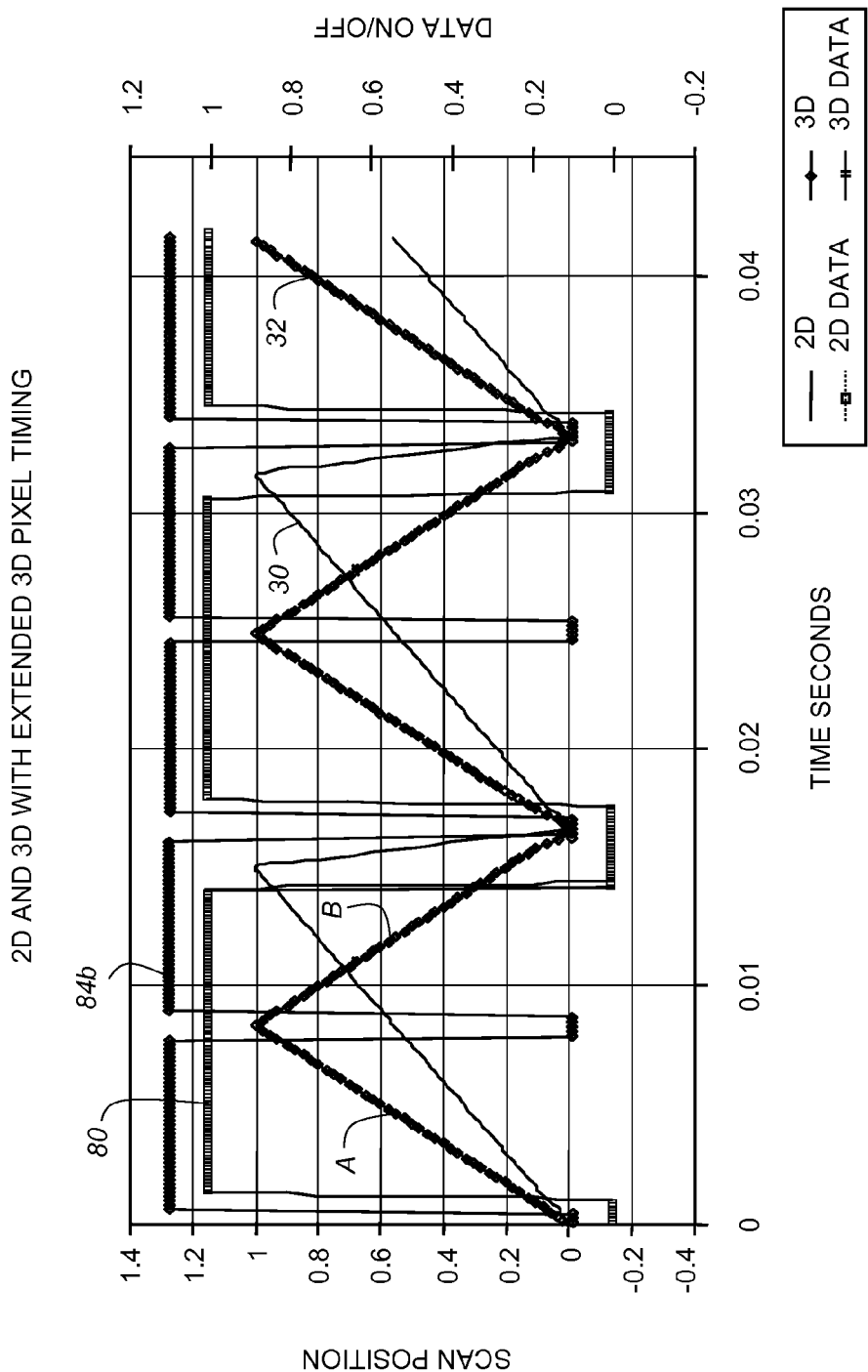
FIG. 5B is an alternate timing diagram comparing the 2-D scan sequence with a bidirectional scan sequence for alternating left- and right-eye image display scanning by a scanning element.

The timing diagrams of FIGS. 5A and 5B compare the conventional 2-D scan sequence with two alternate bidirectional scan sequences for alternating left- and right-eye image display scanning by a scanning element. A number of timing diagrams are overlaid onto each other to make this comparison. The timing diagram shown in FIG. 5A shows the scanning mirror drive signal and data timing for an embodiment in which the total time for scanning a left- and right-eye image according to the method of the present invention (with a triangular drive signal waveform as in FIG. 4) is the same as that conventionally used for forming a 2-D image (shown with a sawtooth drive signal waveform as in FIG. 2). The scanning mirror drive signal 30 and data writing curve 80 correspond to 2-D display embodiments; a drive signal 32 and data timing correspond to 3-D display embodiments. In this case, the time-per-pixel intervals, or "pixel on" time for 2-D and 3-D projection are the same. Advantageously, the clock timing for providing each line of image data to the linear light modulator can be the same as the clock timing used for 2-D embodiments in which the image is formed by the scan in a single direction.

The timing diagram shown in FIG. 5B shows, by comparison, an alternate embodiment in which the total time that is used for forming the left- and right-eye image is longer than that for the corresponding 2-D image (sawtooth with data writing curve 80). One advantage of this approach relates to the longer "pixel on" duty cycle. As a result, using the timing shown in FIG. 5B achieves higher 3-D brightness. Moreover, in this case, the time on per-pixel for 3-D projection can be longer than the pixel-on interval used for 2-D projection. For this case, the clock timing for providing each line of image data to the linear light modulator is different from the clock timing used for conventional 2-D display. 3-D data writing curves 84a and 84b show the "pixel on" portion of timing (shown with a value of 1.1), when writing data is provided for modulation and scanning. The "pixel off" portion of timing of 3-D data writing curves 84a and 84b is shown with a value of 0.1. As described earlier, the left-eye image (L) is projected during the A portion of the galvanometer drive signal 32 and the right-eye image is projected during the B portion of the galvanometer drive signal 32. Note that the image data is momentarily blanked during a switching interval between the left eye and right-eye image in both cases.

It is instructive to make a few observations about the basic sequence shown in FIG. 4 and FIGS. 5A and 5B:

a) The use of this timing arrangement enables the hardware arrangement of FIG. 1, initially usable for two-dimensional imaging, to be used for stereoscopic imaging as well, using shutter glasses. The format of the incoming data must be changed from the two-dimensional case (that is, from the timing shown in FIGS. 2 and 3) in order to deliver data for the left-eye image for one half of the operating time and data for the right-eye image for the other half. Scanning element 77 operation must be altered by changing the sawtooth timing of drive signal 30 (FIG. 2) to the triangular timing of drive signal 32 (FIG. 4). With these few straightforward changes, the same hardware can serve both 2-D and stereoscopic or 3-D imaging modes.

b) Flicker-free 3-D stereoscopic viewing can be realized with the same 60 Hz scan frequency used for 2-D. Moreover, the change to a triangular waveform results in more modest accelerations and allows the duty-cycle to be increased over the 2-D case as shown in FIG. 5B. This is especially helpful given that 3-D projection inherently has a lower overall optical efficiency.

c) The data order for the left-eye image is reversed relative to the data order for the right-eye image. The data for lines of the right-eye image is sequenced in a reversed or mirrored order relative to the sequencing of data for lines of the left-eye image. This is described in more detail subsequently.

d) Various interleaving schemes are possible, such as scanning half of the image for each eye in one pass. This means, for example, providing even-numbered lines of image data for the left-eye image in one traversal of scanning element 77 from left to right, and odd-numbered lines of image data for the left-eye image in the next left-to-right traversal of the mirror. The same interleaving could then be used for the right-eye image.

e) The left-eye image is distinct from the right-eye image. These are two separate images formed within the same image frame, wherein the images are related and can share some content elements, but are not the same image. In fact, stereoscopic appearance and proper depth perception require that there be some disparity between objects displayed for left- and right-eye image viewing in their respective image frames.

f) Image information entering each eye corresponds to a single scan direction. In the example of FIG. 4, the left eye views the image scanned from left to right; the right eye views the image that is scanned from right to left. Precise pixel-to-pixel registration within a frame between left-eye and right-eye images is not needed, lowering cost and complexity.

Figure 6:
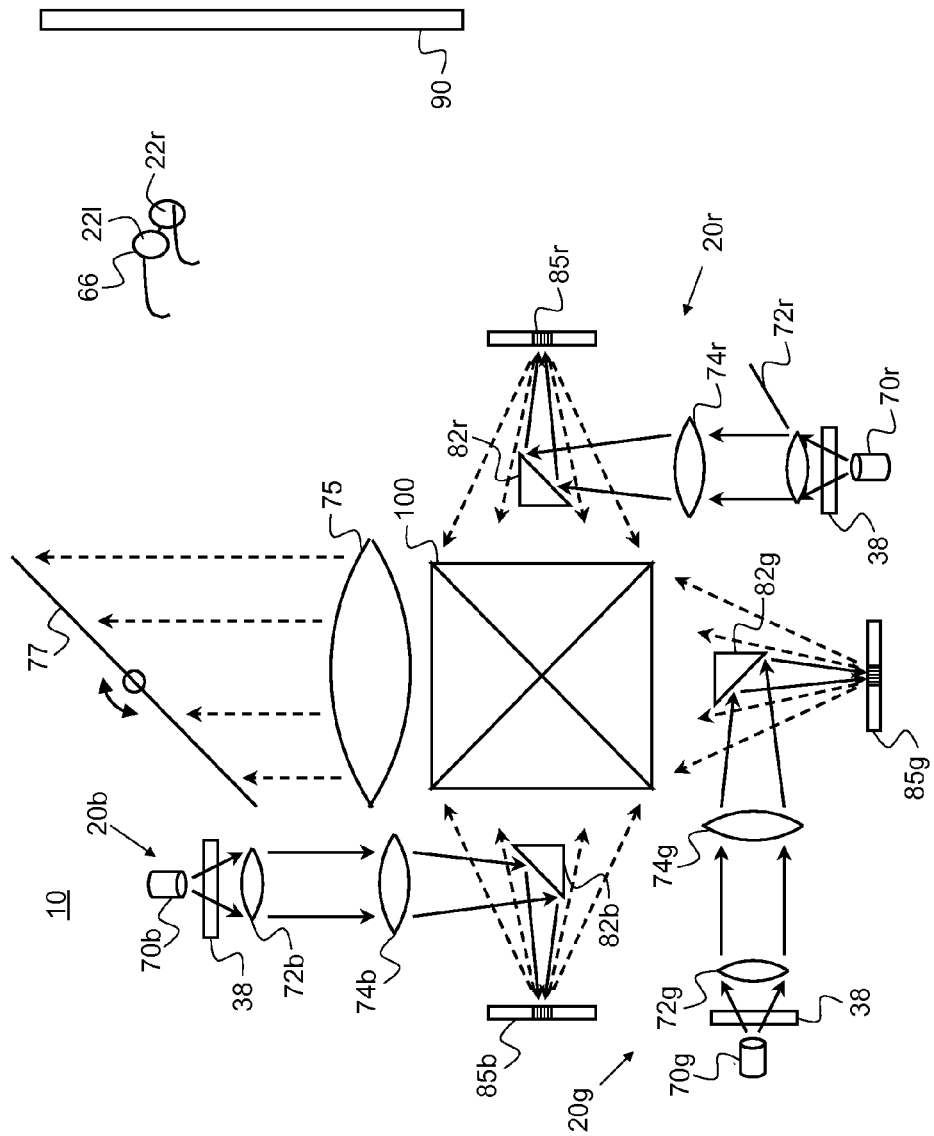
FIG. 6 is a schematic block diagram showing a stereoscopic display apparatus in an alternate embodiment of the present invention that uses polarization switching.

The block diagram of FIG. 6 shows an embodiment that allows display system 10 having three GEMS devices to utilize polarization in order to differentiate left- from right-eye images. Each color channel 20r, 20g, 20b has a polarization alternating device 38 that switches between orthogonal polarization states in synchronization with data for left- and right-eye image formation. The same timing described earlier with reference to FIG. 4 applies. In one embodiment, polarization alternating device 38 switches at 120 Hz, so that left- and right-eye images are each provided at 60 Hz. Types of polarization alternating device 38 include a rotating filter-wheel arrangement, for example. Glasses 66 or other decoding device use polarizers as left and right distinction elements 22l and 22r.

Figure 7:
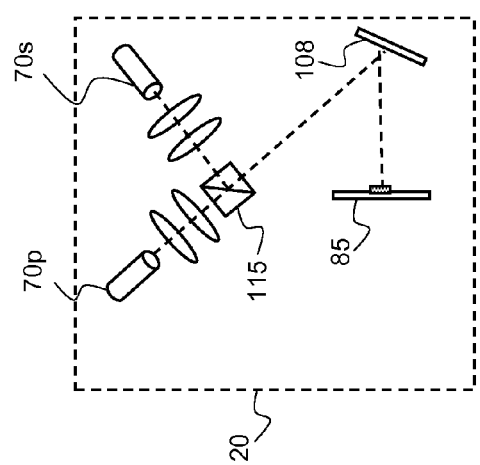
FIG. 7 is a schematic diagram showing illumination of a linear light modulator using either of two alternate light sources.

The block diagram of FIG. 7 shows an alternate arrangement for providing illumination in a color channel 20 for stereoscopic display. In one embodiment using this arrangement, light sources 70p and 70s have orthogonal polarization states. This may be implemented, for example, by interposing a half-wave plate (not shown) in front of a polarized light source. A beamsplitter 115 is a polarization beamsplitter, disposed to direct light from both light sources 70p and 70s onto the same illumination path toward reflective spatial filter 108 and to a grating light modulator, a suitable type of linear light modulator 85. The light sources 70p and 70s are switched on and off at 50% duty cycle at the frame refresh frequency, typically 60 Hz, so that left- and right-eye images are each provided at this frequency.

In an alternate embodiment, spectral separation can be used to differentiate left- and right-eye images. In such a case, the arrangement of FIG. 7 can be used with the basic arrangement of FIG. 6, providing illumination of different colors from light sources 70p and 70s that have different wavelengths. In one exemplary embodiment, where color channel 20 provides the red color channel 20r, light source 70p has light of a first red wavelength (for example, 620 nm) that is intended for the left eye. Light source 70s emits light of a second red wavelength (for example, 640 nm) that is intended for the right eye. Green and blue channels are similarly arranged with light sources of different wavelengths. For this embodiment, beamsplitter 115 is a dichroic beamsplitter, fabricated with a coating that is capable of transmitting light from light source 70p and reflecting the light from light source 70s. Glasses 66 (FIG. 5) then employ different filters as left and right distinction elements 22l and 22r. Polarization alternating device 38 would not be used for a spectral separation embodiment.

Figure 14:
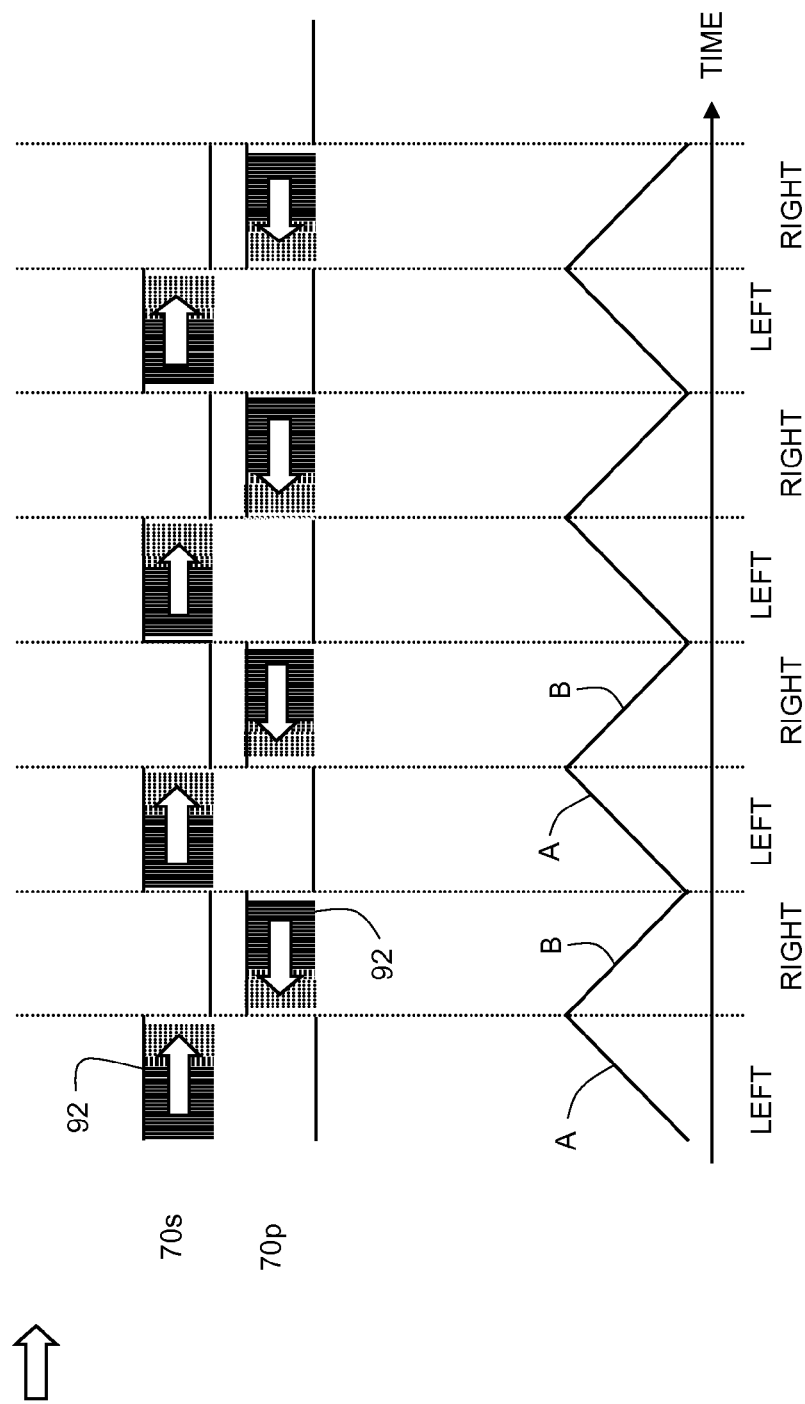
FIG. 14 shows a timing chart for left- and right-eye image projection when using a single linear modulator for both left- and right-eye image formation, as in the embodiment of FIG. 7.

FIG. 14 shows a timing chart for left- and right-eye image projection when using the illumination arrangement of FIG. 7. In this example, actuation of light source 70s corresponds with scanning in a forward direction (as indicated by the arrow pointing to the right) to form the left-eye image in image frame 92. Then, to form the right-eye image in image frame 92, light source 70s is de-activated and light source 70p energized during the reverse scanning of scanning element 77.

Figure 8:
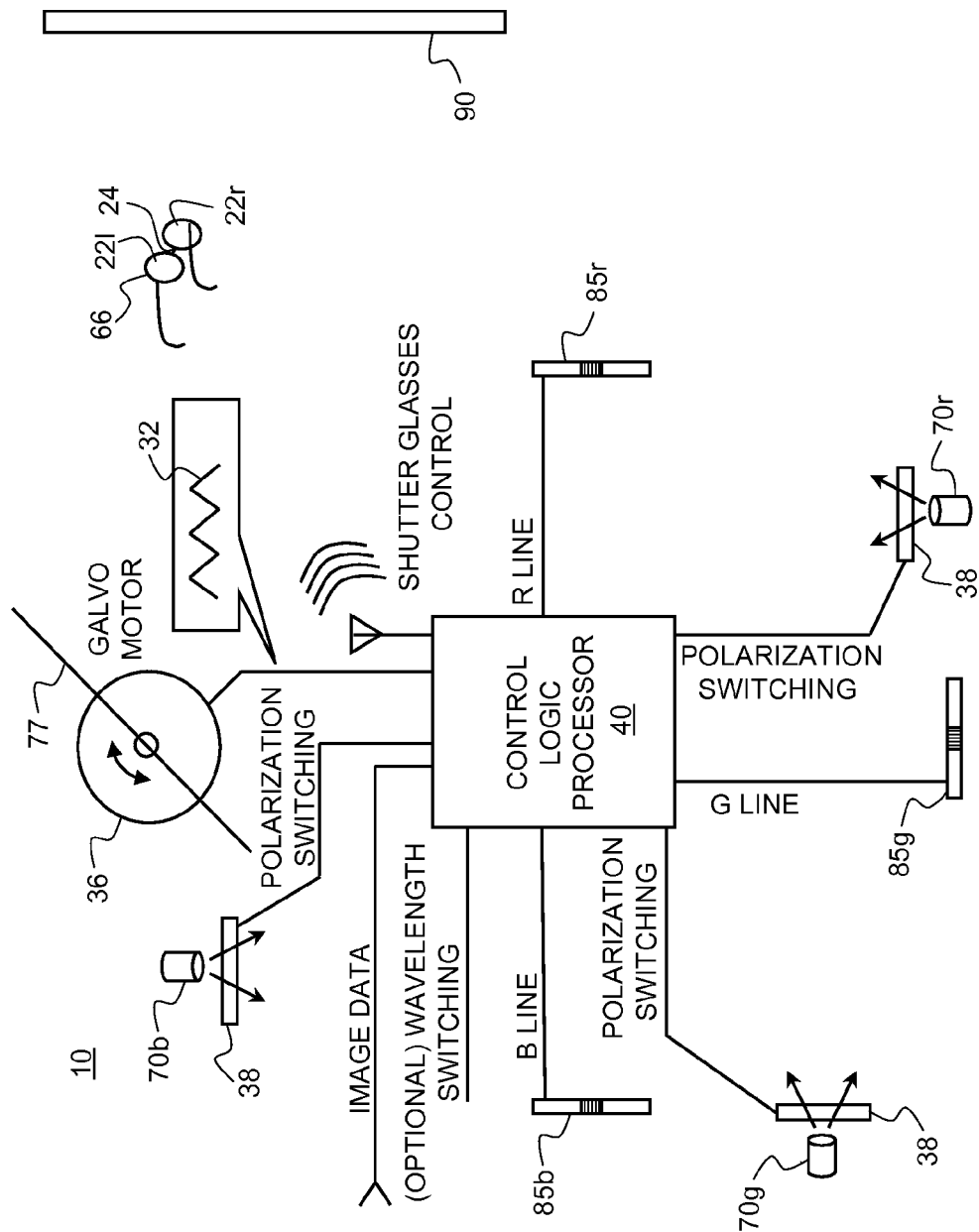
FIG. 8 is a schematic block diagram showing control logic components for controlling operation of the display apparatus in various embodiments.

FIGS. 1 and 6 focus generally on the optical path that extends from the lasers to modulation components, to combining components, to the scanning element, and finally the display surface. As the description of FIGS. 2-4 show, however, there is also underlying timing and control logic circuitry that is needed in order to synchronize the formation of each line of the image that is scanned to the screen. The block diagram of FIG. 8 shows an arrangement of control circuit and timing components for supporting stereoscopic imaging in one embodiment, including components needed for the shutter-glass, polarization separation, and spectral separation schemes. A control logic processor 40 obtains image data for display and provides the data for each color, one line at a time (shown in FIG. 8 as R line, G line, B line), to the linear light modulators 85r, 85g, and 85b, electromechanical grating light modulators in the example embodiments described. Control logic processor 40 also interacts with control components for a galvo motor 36, or other suitable type of actuator, providing drive signal 30 or 32 as described earlier, in coordination with the timing of data delivery to the linear light modulators. Depending on the right-/left-eye separation scheme that is used, control logic processor 40 then controls the switching of the corresponding signals that are switched for each scheme. Where shutter glasses 66 are used, for example, control logic processor 40 controls synchronization element 24 that controls shutter action. Shutter glasses 66 can be controlled wirelessly using an RF signal for actuation, for example, or can be otherwise synchronized with the timing used for left- and right-eye image projection. Alternately, signals can be provided to coordinate polarization and wavelength switching where these distinction schemes are used. FIG. 8 shows multiple switching mechanisms and signals that would be used for supporting each of the three separation schemes; in practice, only one separation technique for distinguishing left- from right-eye images would typically be used.

One advantage of the embodiments shown in FIGS. 1 and 6 relates to the adaptability of these hardware configurations for both 2-D and 3-D imaging. In one embodiment of the present invention, this allows switching between 2-D and 3-D imaging modes as needed, without reconfiguring system hardware. Control logic processor 40 (FIG. 8) can operate galvo motor 36 for either mode using either the sawtooth waveform of drive signal 30 (FIGS. 2 and 3) or the triangular waveform of drive signal 32 (FIG. 4). Alternately, the triangular waveform of drive signal 32 could be used for 2-D imaging, writing lines of modulated light using timing such as that described in U.S. Pat. No. 7,053,930 cited earlier. However, it is instructive to point out that the triangular galvanometer waveform can be disadvantaged for 2-D operation, due to the stringent requirements this places on precise pixel overlay in both scan directions. Since, in 3-D mode, image information entering an eye corresponds to a single scan direction (with the other eye seeing only the image from the opposite scan direction), then the requirement that the sub-images corresponding to each scan direction be precisely registered is significantly relaxed when using embodiments of the present invention. This relaxed precision requirement, in turn, enables lower system complexity and lower scanner cost.

Figure 9A:
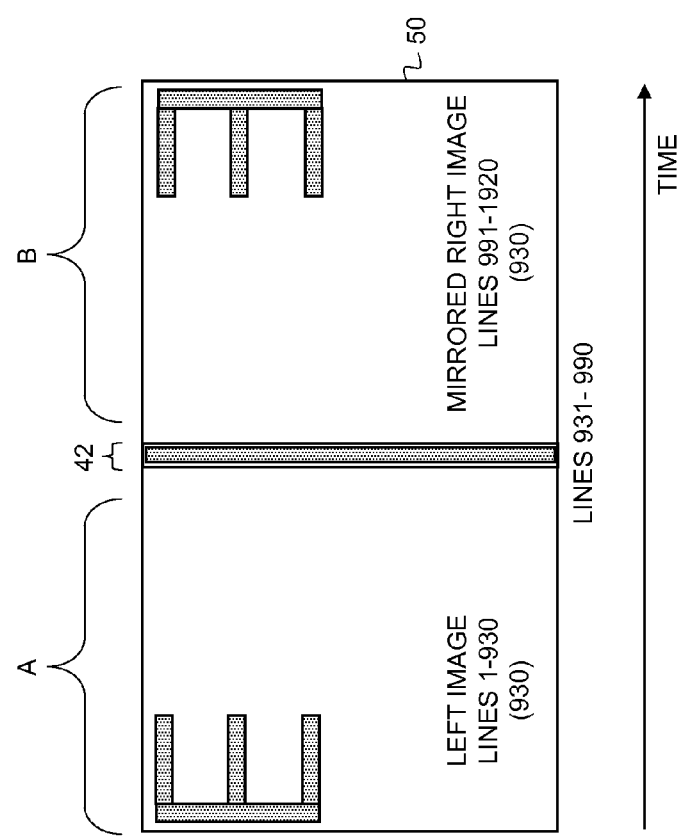
FIG. 9A is a plan view showing the image data arrangement for bidirectional scanning in schematic form.

When using triangular drive signal 32 in either 2-D or 3-D modes, the image data that is provided during the retrace portion B is reversed or mirrored relative to the image data provided during writing portion A. FIG. 9A shows the overall arrangement of an image data buffer 50 that is arranged in an ordered sequence for bidirectional scanning in a single cycle. In this embodiment, image data buffer 50 has 1920 lines and stores the sequential lines of data (lines 1-930) for the left-eye image in the image frame 92 (FIG. 14), shown at A, for the right-eye image (lines 991-1920) shown at B, and a dead band 42 (lines 931-990) between left-eye and right-eye images. Within image data buffer 50, the sequence of image data is reversed for the right-eye image, so that the image data is mirrored as shown. In an alternate embodiment, dead band 42 can be eliminated using a timing delay in the readout of image data buffer 50, thereby allowing increased 3-D resolution.

Figure 9B:
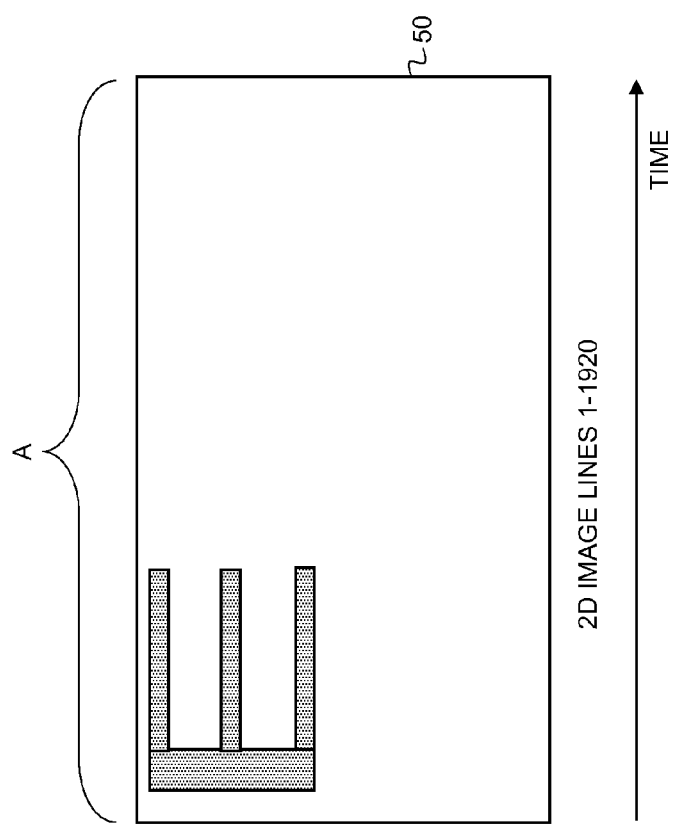
FIG. 9B is a plan view showing the same image data arrangement as in FIG. 9A for unidirectional scanning in schematic form.

For image data buffer 50 in FIG. 9A, the image writing and data delivery move from left to right. During dead band 42 (shaded in this figure), no modulated image data (null data) is provided, corresponding to that fraction of the timing cycle during which scanning element 77 is near the end of its scan distance in which it is rapidly decelerating, stopping, and accelerating. Dead band 42 has a thickness of 60 lines in this embodiment. Where this same image data buffer 50 is used for 2-D scanning, the full image can be stored and written to the linear spatial light modulator in sequence, without mirroring as is needed for the right-eye image in stereoscopic viewing, as shown in FIG. 9B. In this case all 1920 lines of data can be utilized for forming the 2-D image.

For stereoscopic applications where bidirectional scanning is used, it can be advantageous to store and form every other scanned line of the image for a single cycle of the scanning element, depending on the format and resolution of the input image data. With respect to FIGS. 9A and 9B, all of the data for the 2-D or 3-D image, or half of the data (every other line) can be provided over each portion, writing A or retrace B.

In embodiments where all data is supplied for each of the left-eye and right-eye frames, electronics bandwidth in the device drive circuitry is doubled with respect to 2-D sawtooth-scanner-drive operation. However, to reduce design complexity and cost, it is generally desirable to maintain the same electronics circuitry, timing, and operation for both 2-D and 3-D operation. In that case, it is possible to deliver the full number of vertical pixels and to subsample the horizontal pixels in order to obtain the desired bandwidth reduction. Alternatively, it is possible deliver one-half of the vertical pixels (that is, alternate odd or even pixels) on each A and B portion of the scan.

The image data arrangement shown in FIG. 9A supports an exemplary display embodiment for 3-D display having 1920 pixels in the scan direction (horizontal, in this case) and 1080 pixels in length (shown as the vertical axis in FIG. 9A), and using a linear light modulator array 85. The image data arrangement shown in FIG. 9A works with 3-D data writing curve 84a shown in FIG. 5A.

Referring to FIG. 5A, data writing curve 84a has either of two states with an upward transition (from 0 to 1) or a downward transition (from 1 to 0) having different significance. Working from the left, the first upward transition of data writing curve 84a in FIG. 5A corresponds to the beginning of line scanning, using the line data content that begins at the far left edge of the frame buffer represented in FIG. 9A. The downward transitions (1 to 0) of data writing curve 84a in FIG. 5A indicate the respective right edges for the figures formed during portions A and B of the scan.

When writing the 3-D image to the projection screen using the FIG. 9A frame buffer arrangement, a maximum of half of the total number of scanning direction pixels are used for writing the left-eye image and half of the total number of scanning direction pixels are used for writing the right-eye image onto display surface 90. In the particular embodiment that has the image data buffer 50 organization of FIG. 9A, the image data for left- and right-eye images is stored so that it can be readily provided in an ordered sequence and scanned, in the appropriate scanning direction, from one edge of the image frame to the other. Other methods can be used for a similar purpose, providing data for lines of the left-eye image, ordered in sequence from a first edge of the image frame to a second edge of the image frame and providing data for lines of the right-eye image, ordered in sequence from the second edge of the image frame to the first edge of the image frame.

Table 1 shows example performance data for a 60 Hz frame rate projection display with 1920 pixels in the scan direction by 1080 pixel elements, defined as the length of the linear light modulator array in pixels. The forward scan direction (writing portion A of the cycle) has a duty cycle of 80% when used in the 2-D projection mode and 50% when used in the 3-D projection mode. The linear scan range for the galvanometric motor, that part of the cycle at which the galvanometer mirror velocity is a constant, is the same in all cases and is 96.8%. The total time per frame is a constant in all cases. The total pixel on time per image frame varies from 0.0129 seconds for 2-D projection to 0.0159 seconds for the 3-D extended time projection embodiment shown in FIG. 5B, yielding a 23.2% increase in light on the display surface per frame. Also note that, when using the extended scan time timing sequence of FIG. 5B compared to that of the same timing sequence shown in FIG. 5A, the number of active pixel lines in the projected image for each eye can be increased, from 930 to 945 in this embodiment, and the number of blanked pixel lines in the middle of frame data can be reduced to 30 from 60. The total pixel on-time in the duty cycle for image data on the screen is 77.5% for 2-D projection and 95.4% for 3-D projection with the timing sequence shown in FIG. 5B.

TABLE 1

Scan Parameters in Example Embodiments

| Parameter | 2-D | 3-D FIG. 5A | 3-D FIG. 5B |
| --- | --- | --- | --- |
| forward scan duty cycle (%) | 80 | 50 | 50 |
| linear scan range (%) | 96.8 | 96.8 | 96.8 |
| total time per frame (sec) | 0.0167 | 0.0167 | 0.0167 |
| total on pixel time per frame (sec) | 0.0129 | 0.0125 | 0.0159 |
| time per pixel per frame (sec) | 6.73E−06 | 6.73E−06 | 8.41E−06 |
| total on duty cycle (%) | 77.5 | 75 | 95.4 |
| # pixels per half scan | 960 | 930 | 945 |

As was described with reference to FIGS. 6 and 7, both polarization and spectral separation schemes are possible by modifying the illumination arrangement of FIG. 6 and allowing two alternating light sources, of different polarizations or slightly different wavelengths, to illuminate a single linear light modulator 85 in turn. However, there are additional advantages to embodiments using two or more linear arrays per chip, particularly for these separation techniques, as described subsequently.

Embodiments Using Multi-Linear Arrays

Multi-linear GEMS chips are particularly advantaged for stereoscopic display applications. Bilinear GEMS devices, as described in commonly-assigned U.S. Patent Application Publication No. 2007/0047061 entitled (Kowarz), provide two separate electromechanical grating light modulator array sections, that is, two linear arrays of conformal electromechanical grating devices formed on a single substrate. Trilinear GEMS devices are described in U.S. Pat. No. 7,274,500 (Kowarz) provide three separate electromechanical grating light modulator array sections, that is, three linear arrays of conformal electromechanical grating devices formed on a single substrate. In both bilinear and trilinear devices, each of the linear arrays of light modulating devices on a single chip can be separately modulated. Typically, each of the light modulating devices on the multi-linear GEMS arrays has its own associated electronic driver channel.

Figure 10:
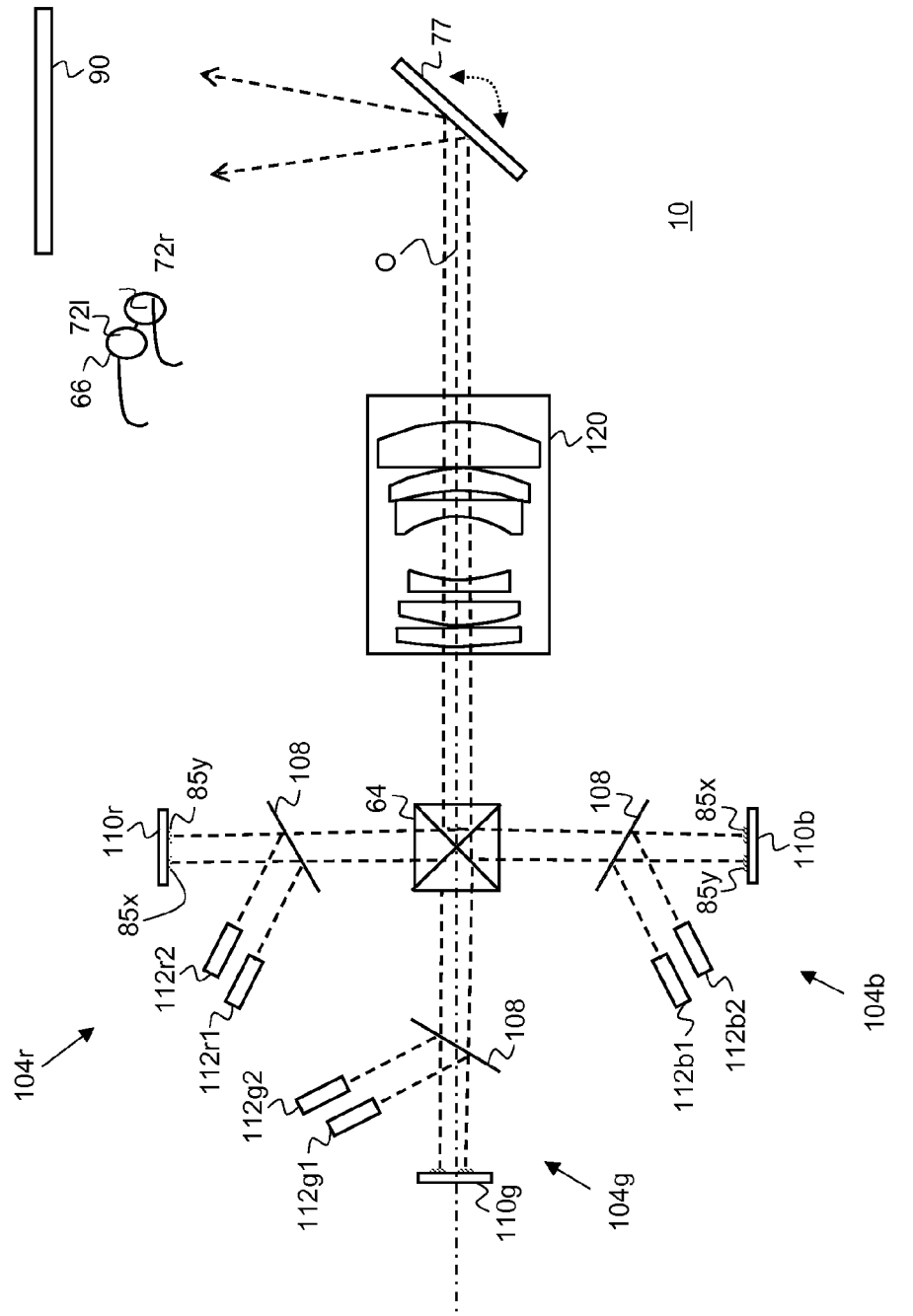
FIG. 10 is a schematic block diagram showing a stereoscopic display apparatus using bilinear light modulators.

Referring to FIG. 10, there is shown an embodiment of a polychromatic display apparatus 10 having three light modulation subsystems, shown as light modulation modules 104r, 104g, and 104b, each corresponding to a color channel. Each of modulation modules 104r, 104g, and 104b use bilinear GEMS spatial light modulator chips 110r, 110 g, and 110b, respectively. Each bilinear GEMS spatial light modulator chip modulates light from two laser light sources, one for the left-eye image and one for the right-eye image. Light from the first of the two laser light sources forms linear illumination incident on a linear light modulator 85x and light from the second of the two laser light sources forms the linear illumination incident on a linear light modulator 85y. In the embodiment of FIG. 10, bilinear GEMS spatial light modulator chip 110r modulates incident linear illumination from red lasers 112r1 and 112r2. Bilinear GEMS spatial light modulator chip 110g modulates incident linear illumination from green lasers 112g1 and 112g2. Bilinear GEMS spatial light modulator chip 110b modulates incident linear illumination from blue lasers 112b1 and 112b2. It should be noted that linear light modulators 85x and 85y are shown with exaggerated spatial separation in the schematic view of FIG. 10 in order to illustrate their function more clearly; in one embodiment, the actual distance between linear arrays of linear light modulators 85x and 85y is on the order of 1 mm. Each of linear light modulators 85x and 85y generates an image for each eye; thus, for example, where the linear array of linear light modulator 85x generates the left-eye image, the linear array of linear light modulator 85y generates the right-eye image.

There is a spatial filter 108, such as a patterned mirror having alternate reflective and transmissive sections, in each light modulation module 104r, 104g, and 104b. The reflective sections of spatial filter 108 direct illumination from each laser light source to its corresponding array of light modulator devices on the bilinear GEMS spatial light modulator chip. Transmissive sections of spatial filter 108 then transmit modulated light from the bilinear GEMS spatial light modulator toward a combiner 64, such as an X-cube, familiar to those skilled in the electronic projection arts and represented in FIG. 10. Unwanted zero-order reflected light from the bilinear GEMS spatial light modulator is also blocked by spatial filter 108.

The modulated light beams from each light modulation module 104r, 104g, and 104b are combined and directed along an optical path O by a combiner 64. Projection optics 120 then direct the modulated light along optical path O toward a single scanning element 77, capable of scanning in a first rotational direction and in a second rotational direction that is opposite the first rotational direction, as described earlier with reference to embodiments in FIGS. 1 through 6. The image is formed on display surface 90. Display surface 90 is a polarization-preserving display surface when polarization is used for left- and right-eye image differentiation. For a polarization-separation embodiment of this type, combiner 64 is substantially polarization-insensitive, providing substantially the same light transmission or reflection behavior for light of orthogonal polarization states.

Figure 11:
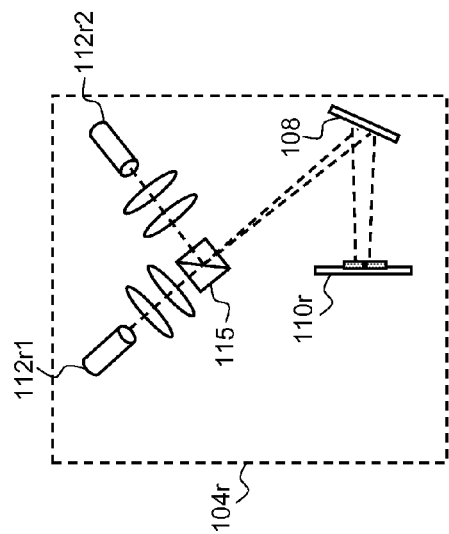
FIG. 11 is a schematic diagram showing illumination of a bilinear light modulator using two alternate light sources.

There are a number of options for directing multiple light sources toward the same bilinear GEMS chip when using the bidirectional scanning sequence of the present invention. One method directs laser light sources from different sources arranged side-by-side, at slightly different angles, as is suggested by the embodiment represented in FIG. 10. The schematic block diagram of FIG. 11 shows another embodiment, used with components of one color channel, light modulation module 104r in this example. Here, beamsplitter 115 combines light from light sources 112r1 and 112r2. Where light sources 112r1 and 112r2 differ by wavelength, beamsplitter 115 is a dichroic beamsplitter. Where light sources 112r1 and 112r2 differ by polarization state, beamsplitter 115 is a polarization beamsplitter.

In order to switch between left- and right-eye images using the arrangement of FIGS. 10 and 11, light sources could be turned on and off for modulation during the appropriate times, as was described earlier with reference to FIG. 14.

Alternately, light sources could be continually energized and the corresponding linear array could direct incident light away from projection components during the appropriate half-cycle when the light is not used.

Trilinear Embodiment

Figure 12A:
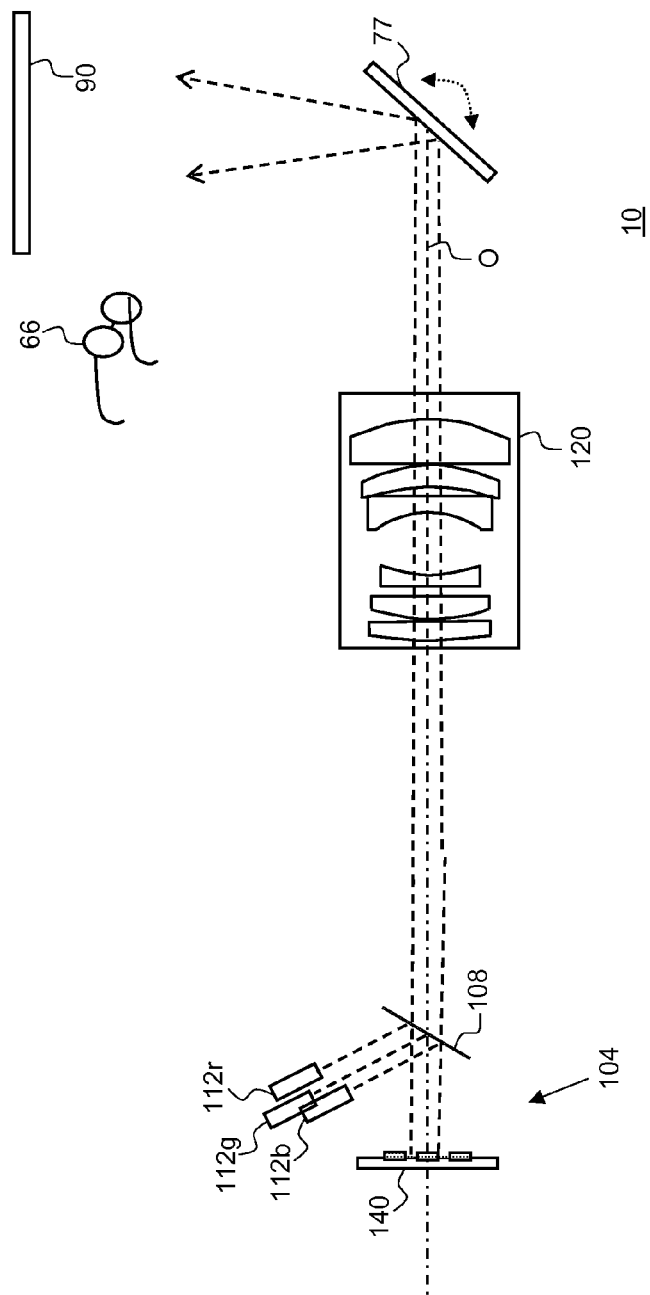
FIG. 12A is a schematic block diagram showing a stereoscopic display apparatus using a trilinear light modulator.

Referring to FIG. 12A, there is shown another embodiment of display apparatus 10 using a light modulation module 104 with a corresponding trilinear GEMS spatial light modulator chip 140. In the embodiment shown, shutter glasses are used to distinguish separate left- and right-eye images.

Figure 12B:
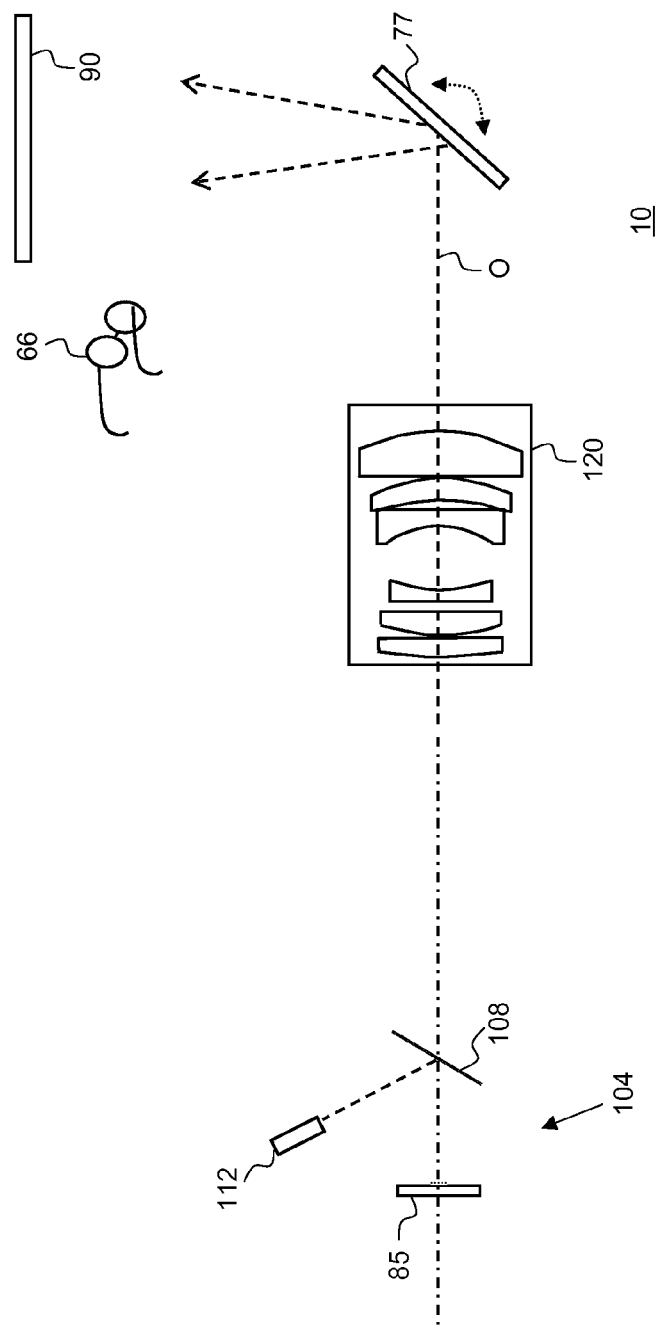
FIG. 12B is a schematic block diagram showing a stereoscopic display using one laser.

Referring to FIG. 12B, there is shown a display apparatus 10 with a light modulation module 104 using a single linear light modulator 85 with a laser 112. This arrangement allows a monochromatic stereoscopic display.

It is known to those skilled in the electronic color projection arts that the green color channel is of particular importance for luminance, and therefore perceived image resolution, and that red and blue color channels are of less significance for this purpose. Further embodiments of the present invention can take advantage of this behavior by providing modulation of different color channels at different resolutions. Thus, for example, the green color channel would be at full resolution. Red and blue color channels would each be at half the resolution of the green color channel along the array axis and, optionally, also along the scan axis.

Reduced resolution arrangements can be advantaged in a number of ways. Response timing requirements for multilinear GEMS spatial light modulator chip can be relaxed. In addition, fabrication requirements can be reduced, allowing additional space for routing of control signal traces on the multilinear GEMS substrate, which can be constrained with full-resolution bilinear and trilinear designs.

Lasers are shown as the light sources for display apparatus 10 in embodiments of the present invention. Lasers can be continuously energized and are advantaged because of their relative spectral purity and spatial coherence. Lasers are particularly advantaged where spectral separation is used to distinguish left- from right-eye images. Laser arrays of particular interest for projection applications are various types of Vertical Cavity Surface-Emitting Laser (VCSEL) arrays, including Vertical Extended Cavity Surface-Emitting Laser (VECSEL) and Novalux Extended Cavity Surface-Emitting Laser (NECSEL) devices from Arasor, Sunnyvale, Calif. However, other types of light sources could be used for providing linear illumination to the GEMS spatial light modulator chip. Methods for providing, from a single light source, light of two orthogonal polarization states are well known to those skilled in the electronic imaging arts.

It can be appreciated that a number of additional stereoscopic configurations using multilinear electromechanical arrays are within the scope of the present invention. Additional primary colors can be added using combinations with additional bilinear or trilinear arrays.

The stereoscopic embodiments shown in FIGS. 1, 6, 10, 12A and 12B can switch modes, operating either in three-dimensional stereoscopic mode or in two-dimensional imaging mode. With respect to FIG. 6, for example, it can be advantageous to use the same image content for both left- and right-eye images, so that polarization or spectral differences are not visible to the viewer. Then, where stereoscopic image content is available, the imaging mode can be switched accordingly. Glasses 66 or other type of decoding device could then be used to distinguish separate left- and right-eye images only for the stereoscopic imaging portion. Switching can be performed automatically, such as by sensing the presence of 3-D imaging data at control logic processor 40 (FIG. 8) or can be performed by providing a switch for actuation by the viewer(s).

Dual Viewer Embodiments

Stereoscopic display apparatus 10 can alternately be used for dual-viewer projection. The subject of considerable interest for gaming and simulation applications, dual-viewer operation is a variant of stereoscopic operation, provided using stereoscopic projection apparatus and techniques, with only a slight change at the viewer end. For dual-viewer mode, the change is straightforward: what has been termed the "left-eye image" is now intended for a first viewer and what has been termed the "right-eye image" is intended for a second viewer.

Figure 13:
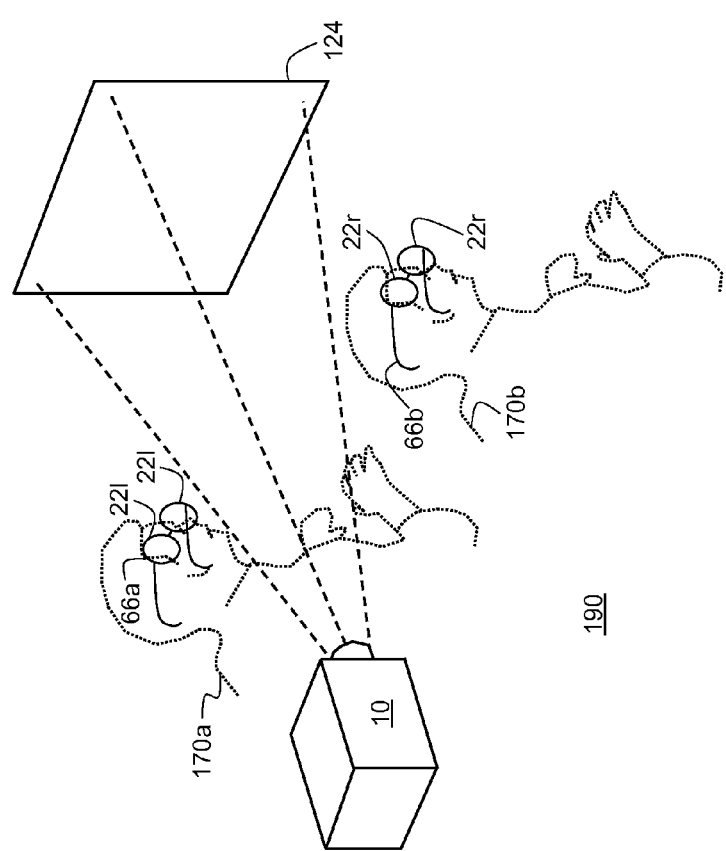
FIG. 13 is a block diagram showing a display apparatus in a dual viewer application.

FIG. 13 shows a dual-viewer display system 190 in one embodiment. Stereoscopic display apparatus 10 operates in the same manner described earlier with reference to the embodiments shown in FIGS. 1, 6, 10, 12A and 12B, providing left- and right-eye images. A first viewer 170a has glasses 66a or other type of decoding device with distinction elements 22l installed in front of both eyes and thus views only the left-eye image. Similarly, a second viewer 170b views only the right-eye image, using glasses 66b with distinction elements 22r for both eyes. As can be seen from FIG. 13, the only modification needed to the stereoscopic display system for dual viewing is substituting glasses 66a and 66b (or other suitable decoding devices) for glasses 66 shown in FIGS. 1, 5, 9, and 11. This arrangement allows two different views, so that one or more viewers 170a can see the left viewer image (corresponding to the left-eye image in the example embodiment of FIGS. 1, 6, 10, and 12A) and one or more viewers 170b can see the right viewer image (corresponding to the right-eye image in the example embodiment of FIGS. 1, 6, 10, and 12A).

Of particular interest for consumer display applications, dual-viewer operation allows two viewers to simultaneously enjoy different programs or two competing gamers to each have full-screen separate perspectives of the same game in which they are each engaged. Multiple viewers could be provided with glasses 66a and 66b for dual-viewer display.

The invention has been described in detail with particular reference to certain preferred embodiments thereof, but it will be understood that variations and modifications can be effected within the scope of the invention as described above and as noted in the appended claims by a person of ordinary skill in the art without departing from the scope of the invention. For example, although GEMS devices are shown in the example embodiments described herein, the use of other types of linear light modulators can be envisioned. Grating light valve (GLV) components could alternately be used for forming left- and right-eye line images in some embodiments. The mirror direction for either right- or left-eye images could be altered from that shown in the examples. Other types of scanning devices could be used. Scan lines could be vertically or horizontally disposed. Monochromatic or polychromatic images can be displayed.

Thus, what is provided is an apparatus and method for using multilinear electromechanical grating devices or other types of linear light modulators for stereoscopic projection.

PARTS LIST

| | |
|---|---|
| 10 | display system |
| 20 | color channel |
| 20r | red color channel |
| 20g | green color channel |
| 20b | blue color channel |
| 22l | left distinction element |
| 22r | right distinction element |
| 24 | synchronization element |
| 30 | drive signal |
| 32 | drive signal |
| 36 | galvo motor |
| 38 | polarization alternating device |
| 40 | control logic processor |
| 42 | dead band |
| 50 | image data buffer |
| 64 | combiner |
| 66 | glasses |
| 66a | glasses |
| 66b | glasses |
| 70r | light source |
| 70g | light source |
| 70b | light source |
| 70p | light source |
| 70s | light source |
| 72r | spherical lens, red |
| 72g | spherical lens, green |
| 72b | spherical lens, blue |
| 74r | cylindrical lens, red |
| 74g | cylindrical lens, green |
| 74b | cylindrical lens, blue |
| 75 | lens |
| 77 | scanning element |
| 77a | scanning element |
| 77b | scanning element |
| 77c | scanning element |
| 77d | scanning element |
| 80 | data writing curve |
| 82 | turning mirror |
| 82r | turning mirror, red |
| 82g | turning mirror, green |
| 82b | turning mirror, blue |
| 84a | 3-D data writing curve |
| 84b | 3-D data writing curve |
| 85 | linear light modulator |
| 85r | linear light modulator |
| 85g | linear light modulator |
| 85b | linear light modulator |
| 85x | linear light modulator |
| 85y | linear light modulator |
| 90 | display surface |
| 92 | image frame |
| 100 | color combiner |
| 104 | light modulation module |
| 104l | light modulation module |
| 104r | light modulation module |
| 104g | light modulation module |
| 104b | light modulation module |
| 106 | illumination optics |
| 108 | spatial filter |
| 110r | bilinear GEMS spatial light modulator chip |
| 110g | bilinear GEMS spatial light modulator chip |
| 110b | bilinear GEMS spatial light modulator chip |
| 112 | laser |
| 112r | laser |
| 112g | laser |
| 112b | laser |
| 112r1 | laser |
| 112r2 | laser |
| 112g1 | laser |
| 112g2 | laser |
| 112b1 | laser |
| 112b2 | laser |
| 115 | beamsplitter |
| 120 | projection optics |
| 140 | trilinear GEMS spatial light modulator chip |
| 170a | viewer |
| 170b | viewer |
| 190 | dual-viewer display system |
| E1 | edge |
| E2 | edge |
| O | optical path |
| A | writing portion |
| B | retrace portion |
| S | scan cycle |

The invention claimed is:

1. A method for forming a stereoscopic image comprising:
   a) forming separate left-eye and right-eye images in a repeated cycle that comprises:
      (i) forming the left-eye image by providing data for lines of the left-eye image, ordered in sequence from a first edge of an image frame to a second edge of the image frame;
      forming successive lines of modulated light according to the ordered sequence of provided data for lines of the left-eye image and progressively scanning the lines of modulated light across a display surface from a first position to a second position;
      (ii) forming the right-eye image by providing data for lines of the right-eye image, ordered in sequence from the second edge of the image frame to the first edge of the image frame;
      forming successive lines of modulated light according to the ordered sequence of provided data for lines of the right-eye image and progressively scanning the lines of modulated light across the display surface from the second position to the first position; and
   b) distinguishing the left-eye image from the right-eye image for at least one viewer.

2. The method of claim 1 wherein at least some of the lines of modulated light for the left-eye image have the same wavelength and are formed using the same linear light modulator as some of the lines of modulated light for the right-eye image.

3. The method of claim 2 wherein a polarization separating device is used for distinguishing light from left-eye and right-eye images.

4. The method of claim 1 wherein a portion of the modulated light for the left-eye image is formed using a first linear array and a portion of the modulated light for the right-eye image is formed using a second linear array and wherein both first and second linear arrays are on the same substrate.

5. The method of claim 1 wherein lines of the left-eye image are at a first wavelength and lines of the right-eye image are at a second wavelength and wherein the first wavelength is within 40 nm of the second wavelength.

6. The method of claim 1 wherein lines of modulated light for the left-eye image and lines of modulated light for the right-eye image are circularly polarized.

7. The method of claim 1 wherein lines of modulated light for the left-eye image are formed using a grating electromechanical system device.

8. The method of claim 1 wherein polarized viewing glasses are used for distinguishing light from left-eye and right-eye images.

9. The method of claim 1 wherein shutter glasses are used for distinguishing light from left-eye and right-eye images.

10. The method of claim 1 wherein spectral filters are used for distinguishing light from left-eye and right-eye images.

11. The method of claim 1 wherein scanning the lines of modulated light comprises rotating a scanning element in either a forward or in a reverse direction.

12. The method of claim 11 wherein the rotating scanning element is a galvanometric mirror.

13. The method of claim 1 wherein the left-eye and right-eye images are color images.

14. The method of claim 1 wherein providing data for lines of the left-eye and right-eye images comprises arranging data in a frame buffer.

15. A method for displaying an image on a display surface in either of two modes by switching between:
   (i) forming a two dimensional image by a repeated sequence of progressively scanning lines of modulated light towards a display surface while rotating a scanning element forward from a first position to a second position; and
   (ii) forming a stereoscopic image that comprises a left-eye image and a right-eye image, by the repeated steps of:
      forming the left-eye image by progressively scanning lines of modulated light towards a display surface while rotating a scanning element forward from a first position to a second position; and
      forming the right-eye image by progressively scanning lines of modulated light towards the display surface while rotating the scanning element backward from the second position to the first position.

16. The method of claim 15 wherein switching is performed automatically by control logic that is associated with a projection apparatus.

17. The method of claim 15 wherein switching further comprises changing the clock timing for forming the stereoscopic image.

18. The method of claim 15 wherein the number of scanning lines of modulated light in the two dimensional image is at least twice the number of scanning lines of modulated light in each of the left-eye image and the right-eye image.

19. The method of claim 15 wherein the pixel-on time per image frame for the stereoscopic image exceeds the pixel-on time per image frame for the two-dimensional image.

20. A method for displaying an image on a display surface in either of two modes by switching between:
   (i) providing data for lines of a two dimensional image, ordered in sequence from a first edge of an image frame to a second edge of the image frame;
   forming successive lines of modulated light according to the ordered sequence of provided data for lines of the two dimensional image and progressively scanning the lines of modulated light towards a display surface while rotating a scanning element forward from a first position to a second position; and
   (ii) forming separate left-eye and right-eye images in a cycle that comprises:
      (a) forming the left-eye image by providing data for lines of the left-eye image, ordered in sequence from a first edge of an image frame to a second edge of the image frame;
      forming successive lines of modulated light according to the ordered sequence of provided data for lines of the left-eye image and progressively scanning the lines of modulated light towards a display surface while rotating a scanning element forward from a first position to a second position;
      (b) forming the right-eye image by providing data for lines of the right-eye image, ordered in sequence from the second edge of the image frame to the first edge of the image frame;
      forming successive lines of modulated light according to the ordered sequence of provided data for lines of the right-eye image and progressively scanning the lines of modulated light towards the display surface while rotating the scanning element in reverse from the second position to the first position; and
      c) distinguishing the left-eye image from the right-eye image for at least one viewer.

* * * * *